March 6, 1934.  H. A. KNOX ET AL  1,949,423
TRACK FOR TRACKLAYING VEHICLES
Filed March 23, 1933
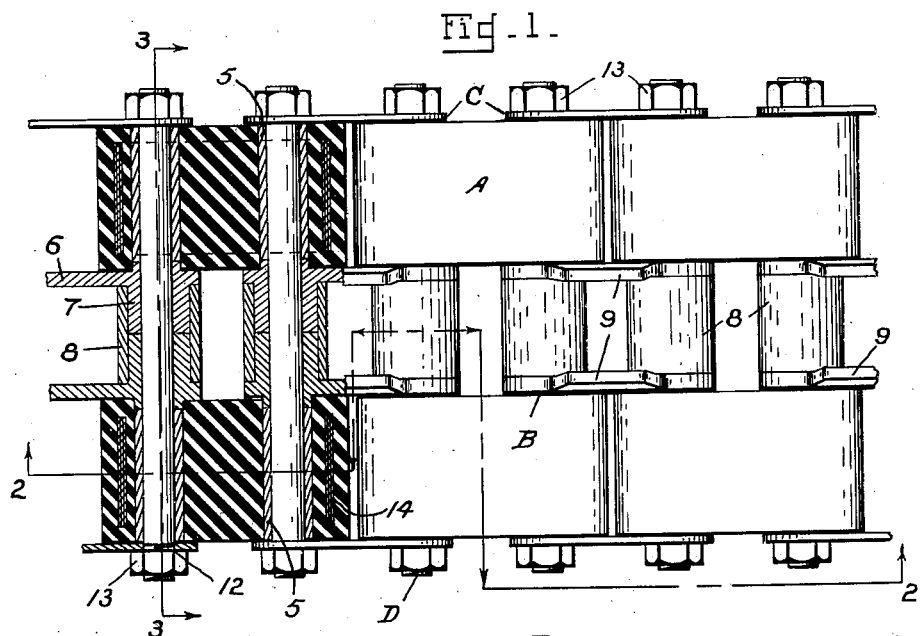
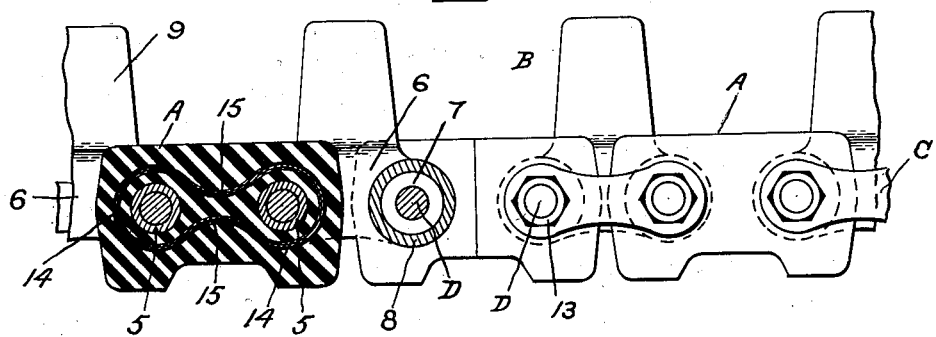
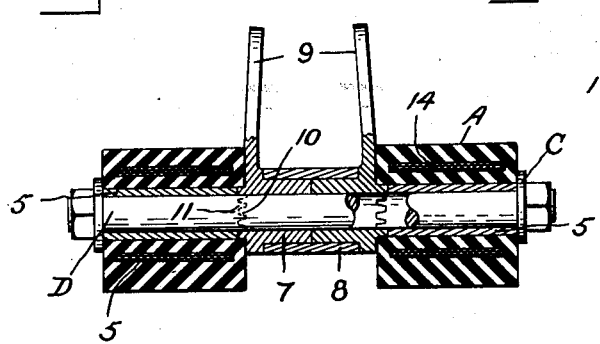
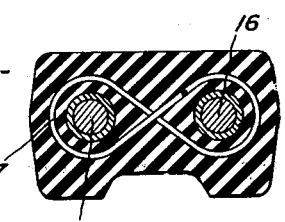
Inventors
Harry A. Knox
Thomas H. Nixon
By W. N. Roach
Attorney Patented Mar. 6, 1934

1,949,423

UNITED STATES PATENT OFFICE 1,949,423

TRACK FOR TRACKLAYING VEHICLES

Harry A. Knox, Davenport, Iowa, and Thomas H. Nixon, United States Army, Gettysburg, Pa.

Application March 23, 1933, Serial No. 662,261

6 Claims. (Cl. 305—10)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to a track for tracklaying vehicles.

The purpose of this invention is to provide a track which is conveniently formed of sections in the manner of a jointed link track but which operates in flection in the manner of a jointless band track. The track comprises a double row of rubber blocks or shoes whose inner side constitutes a rail for the supporting wheels of the vehicle and whose outer side is adapted to engage the ground.

The shoes are arranged in a novel manner and include bushings that are locked to centrally disposed links forming driving lugs.

To these and other ends, the invention consists in the construction, arrangement and combination of elements described hereinafter and pointed out in the claims forming a part of this specification.

A practical embodiment of the invention is illustrated in the accompanying drawing, wherein:

Fig. 1 is a plan view, partly in section, of a portion of the lower flight of an endless track constructed in accordance with the invention.

Fig. 2 is a view taken on the line 2—2 of Fig. 1.

Fig. 3 is a view taken on the line 3—3 of Fig. 1 and

Fig. 4 is a longitudinal sectional view through a modified form of block.

Referring to the drawing by characters of reference:

The track comprises a double row of shoes A connected in spaced relation by links B and C mounted on the link pins D.

The shoes are all identical and consist of a block of resilient material, such as rubber, capable of bending sufficiently to enable an endless track formed of the blocks to be trained about the wheels of a vehicle. The inner sides of the blocks form a rail for the wheels of the vehicle while the outer sides are adapted to provide a traction surface for engaging the ground. A pair of bushings 5—5 extend laterally through each block adjacent its ends and are vulcanized thereto. The aligned bushings 5 of a pair of shoes receive a pair of the link pins D.

The adjacent link pins of adjacent pairs of shoes are connected by the links B and C. The links B are placed between the rows of shoes. They are preferably formed of two identical parts, each including a side rail 6 having at its ends hubs 7—7 extending laterally on the same side of the rail. The pair of links B are mounted on the link pins with their hubs abutting so that the side rails are spaced. A sleeve or roller 8 embraces each pair of adjoining hubs 7 and is confined between the side rails 6. The rollers are equally spaced in the longitudinal direction of the track and constitute the driving lugs to be engaged by the sprocket wheel (not shown). When the rollers are omitted the hubs form the driving lugs. The side rails 6 are also provided with upstanding arms 9 which extend beyond the rail surface of the shoes and constitute guide lugs to keep the track in proper relation with the sprocket and idler wheels and the supporting wheels of the vehicle.

The hubs 7 (Fig. 3) are each provided with an annular series of spaced teeth 10 disposed axially of the hub and adapted to engage or clutch a similar series of teeth 11 provided on the inner end of the bushings 5. This arrangement serves to lock or hold the links B, bushings 5 and shoes A against independent rotational movement relative to the link pins D so that flection must occur in the intermediate portions of the shoes between the link pins.

The links C, placed on the outer sides of the rows of shoes, connect the adjacent link pins of adjacent pairs of shoes and are complementary to the links B. The links C are in the form of plates having apertures 12 whereby they are mounted on the link pins. They are retained on the link pins in any suitable manner, specifically by nuts 13.

The rubber blocks forming the shoes are preferably reinforced. As shown in Fig. 2, the reinforcement consists of a fabric or cords 14 forming an endless loop and embedded in the rubber to which they are vulcanized. The reinforcement loops 14 are preferably spaced from the bushings 5 by an appreciable thickness of rubber. The reaches 15 of the loops are preferably formed on a curve that is reverse to the curvature of the end portions trained around the bushings. By virtue of the curvature of the reaches any distortion of the rubber shoe tending to straighten out the reaches will be distributed more or less uniformly throughout the reaches and to that part of the rubber vulcanized thereto.

In the modified form shown in Fig. 4 the reinforcement consists of a wire cable 16 trained around the bushings 17 and crossed at the center between the bushings. This arrangement gives maximum flexibility and lengthwise strength to the blocks. The cable may be in the form of separate endless loops or it may be formed of one or more lengths of cable wound around the bushings to produce a similar arrangement.

We claim:

1. In a track for track-laying vehicles, a double row of shoes, each shoe consisting of a block of flexible material, a pair of bushings extending laterally through and fixed in opposite ends of each block, teeth on the inner ends of the bushings, link pins passing through the bushings of laterally adjacent shoes, pairs of links disposed between the rows of shoes and connecting adjacent link pins of longitudinally adjacent shoes, each of said links formed of a side plate having hubs extending laterally on the same side of the side plate, the hubs mounted on the link pins and arranged in abutting relation whereby the side plates are spaced, teeth on the outer sides of the links and engaging the teeth of the bushings, sleeves loosely mounted on the abutting hubs, and links connecting the outer ends of associated link pins.

2. In a track for track-laying vehicles, a double row of shoes, each shoe consisting of a block of flexible material, a pair of bushings extending laterally through and fixed in opposite ends of each block, teeth on the inner ends of the bushings, link pins passing through the bushings of laterally adjacent shoes, pairs of links disposed between the rows of shoes and connecting adjacent link pins of longitudinally adjacent shoes, each of said links formed of a side plate having hubs extending laterally on the same side of the side plate, the hubs mounted on the link pins and arranged in abutting relation whereby the side plates are spaced, teeth on the outer sides of the links and engaging the teeth of the bushings, and links connecting the outer ends of associated link pins.

3. In a track for track-laying vehicles, a double row of shoes, each shoe consisting of a block of flexible material, a pair of bushings extending laterally through and fixed in opposite ends of each block, link pins passing through the bushings of laterally adjacent shoes, pairs of links disposed between the rows of shoes and connecting adjacent link pins of longitudinally adjacent shoes, each of said links formed of a side plate having hubs extending laterally on the same side of the side plate, the hubs mounted on the link pins and arranged in abutting relation whereby the side plates are spaced, cooperating means on the links and bushings whereby they are locked together, and links connecting the outer ends of associated link pins.

4. In a track for track-laying vehicles, a double row of shoes, each shoe consisting of a block of flexible material, a pair of bushings extending laterally through and fixed in opposite ends of each block, link pins passing through the bushings of laterally adjacent shoes, pairs of links disposed between the rows of shoes and connecting adjacent link pins of longitudinally adjacent shoes, each of said links formed of a side plate having hubs extending laterally on the same side of the side plate, the hubs mounted on the link pins and arranged in abutting relation whereby the side plates are spaced, and means for locking the links and bushings against relative independent rotational movement, and links connecting the outer ends of associated link pins.

5. In a track for track-laying vehicles, a double row of shoes, each shoe consisting of a block of flexible material, a pair of bushings extending laterally through and fixed in opposite ends of each block, link pins passing through the bushings of laterally adjacent shoes, links laterally spacing the rows of shoes and connecting adjacent link pins of longitudinally adjacent shoes, cooperating means on said links and the bushings whereby they are locked together, and links connecting the outer ends of associated link pins.

6. In a track for track-laying vehicles, a double row of shoes, each shoe consisting of a block of flexible material, a pair of bushings extending laterally through and fixed in opposite ends of each block, link pins passing through the bushings of laterally adjacent shoes, links laterally spacing the rows of shoes and connecting adjacent link pins of longitudinally adjacent shoes, and cooperating means on said links and the bushings whereby they are locked together.

HARRY A. KNOX.
THOMAS H. NIXON.